United States Patent
Gates et al.

(10) Patent No.: US 8,586,285 B2
(45) Date of Patent: Nov. 19, 2013

(54) METHODS FOR FORMING SHEETING WITH A COMPOSITE IMAGE THAT FLOATS AND A MASTER TOOLING

(75) Inventors: Brian J. Gates, Oscelola, WI (US);
Robert T. Krasa, Hudson, WI (US);
Travis L. Potts, Woodbury, MN (US);
Serge Wetzels, Newport, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 364 days.

(21) Appl. No.: 12/744,515

(22) PCT Filed: Nov. 10, 2008

(86) PCT No.: PCT/US2008/082951
§ 371 (c)(1),
(2), (4) Date: Aug. 20, 2010

(87) PCT Pub. No.: WO2009/070434
PCT Pub. Date: Jun. 4, 2009

(65) Prior Publication Data
US 2010/0316959 A1    Dec. 16, 2010

Related U.S. Application Data

(60) Provisional application No. 60/990,446, filed on Nov. 27, 2007.

(51) Int. Cl.
*G02B 5/02* (2006.01)
*G03F 7/00* (2006.01)

(52) U.S. Cl.
USPC ............................................ 430/321; 430/320

(58) Field of Classification Search
None
See application file for complete search history.

(56) References Cited

U.S. PATENT DOCUMENTS

| 1,905,716 A | 4/1933 | Ives |
| 1,918,705 A | 7/1933 | Ives |

(Continued)

FOREIGN PATENT DOCUMENTS

| CA | 2 326 180 | 3/1999 |
| CA | 2 400 894 | 8/2001 |

(Continued)

OTHER PUBLICATIONS

3M Security Systems Division, Product Fact Sheet, 3M™ Authentication Reader, © 3M 2004, 4 pages.

(Continued)

*Primary Examiner* — Martin Angebranndt
(74) *Attorney, Agent, or Firm* — Bradford B. Wright (57) ABSTRACT

A sheeting and a method of forming a sheeting from a master tool are described where the sheeting has a composite image that floats above or below the sheeting. The method includes providing a first sheeting comprising a first array of microlenses and a photopolymerizable first material layer adjacent to the first array of microlenses. Another step is exposing the first sheeting to a radiation source to form a master tool comprising a plurality of polymerized first structured areas in the first material layer, wherein at least some of the first structured areas include a portion shape in common with at least some of the first structured areas and wherein each first structured area is associated with one of the first array of microlenses. Yet another step is replicating the plurality of first structured areas using a substance that conforms to the plurality of structured areas to form a second material layer having a plurality of replicated structured areas.

13 Claims, 5 Drawing Sheets

(56) References Cited

U.S. PATENT DOCUMENTS

| | | | |
|---|---|---|---|
| 2,039,648 A | 5/1936 | Ives | |
| 2,063,985 A | 12/1936 | Coffey | |
| 2,279,825 A | 4/1942 | Kaszab | |
| 2,326,634 A | 8/1943 | Gebhard | |
| 2,500,511 A | 3/1950 | Bonnet | |
| 2,622,472 A | 12/1952 | Bonnet | |
| 2,833,176 A | 5/1958 | Ossoinak | |
| 3,154,872 A | 11/1964 | Nordgren | |
| 3,161,509 A | 12/1964 | Howe | |
| 3,306,974 A | 2/1967 | Cunnally | |
| 3,357,770 A | 12/1967 | Clay | |
| 3,365,350 A | 1/1968 | Cahn | |
| 3,442,569 A | 5/1969 | Bonnet | |
| 3,459,111 A | 8/1969 | Cooper, Jr. | |
| 3,503,315 A | 3/1970 | Montebello | |
| 3,530,779 A | 9/1970 | Alofs | |
| 3,584,369 A | 6/1971 | Montebello | |
| 3,607,273 A | 9/1971 | Kinney | |
| 3,613,539 A | 10/1971 | Dudley | |
| 3,671,122 A | 6/1972 | Dudley | |
| 3,676,130 A | 7/1972 | Burckhardt | |
| 3,683,773 A | 8/1972 | Dudley | |
| 3,706,486 A | 12/1972 | de Montebello | |
| 3,751,258 A | 8/1973 | Howe et al. | |
| 3,801,183 A | 4/1974 | Sevelin | |
| 4,034,555 A | 7/1977 | Rosenthal | |
| 4,054,635 A * | 10/1977 | Schlesinger et al. | 264/219 |
| 4,082,426 A | 4/1978 | Brown | |
| 4,099,838 A | 7/1978 | Cook | |
| 4,121,011 A | 10/1978 | Glover | |
| 4,200,875 A | 4/1980 | Galanos | |
| 4,315,665 A | 2/1982 | Haines | |
| 4,420,527 A | 12/1983 | Conley | |
| 4,424,990 A | 1/1984 | White | |
| 4,541,727 A | 9/1985 | Rosenthal | |
| 4,541,830 A | 9/1985 | Hotta | |
| 4,552,442 A | 11/1985 | Street | |
| 4,557,590 A | 12/1985 | Winnek | |
| 4,618,552 A | 10/1986 | Tanaka | |
| 4,621,898 A | 11/1986 | Cohen | |
| 4,629,667 A | 12/1986 | Kistner | |
| 4,632,895 A | 12/1986 | Patel | |
| 4,634,220 A | 1/1987 | Hockert | |
| 4,650,283 A | 3/1987 | Orensteen | |
| 4,668,063 A | 5/1987 | Street | |
| 4,688,894 A | 8/1987 | Hockert | |
| 4,691,993 A | 9/1987 | Porter | |
| 4,694,993 A | 9/1987 | Endo | |
| 4,700,207 A | 10/1987 | Vanier | |
| 4,708,920 A | 11/1987 | Orensteen | |
| 4,714,656 A | 12/1987 | Bradshaw | |
| 4,732,453 A | 3/1988 | de Montebello et al. | |
| 4,743,526 A | 5/1988 | Ando | |
| 4,757,350 A | 7/1988 | Street | |
| 4,765,656 A | 8/1988 | Becker | |
| 4,772,582 A | 9/1988 | DeBoer | |
| 4,775,219 A | 10/1988 | Appeldorn | |
| 4,783,141 A | 11/1988 | Baba | |
| 4,799,739 A | 1/1989 | Newswanger | |
| 4,833,124 A | 5/1989 | Lum | |
| 4,876,235 A | 10/1989 | DeBoer | |
| 4,892,336 A | 1/1990 | Kaule | |
| 4,917,292 A | 4/1990 | Drexler | |
| 4,920,039 A | 4/1990 | Fotland | |
| 4,927,238 A | 5/1990 | Green | |
| 4,935,335 A | 6/1990 | Fotland | |
| 5,064,272 A | 11/1991 | Bailey | |
| 5,091,483 A | 2/1992 | Mazurek | |
| 5,105,206 A | 4/1992 | Sarraf | |
| 5,169,707 A | 12/1992 | Faykish | |
| 5,183,597 A | 2/1993 | Lu | |
| 5,204,160 A | 4/1993 | Rouser | |
| 5,244,288 A | 9/1993 | Nagaoka | |
| 5,254,390 A | 10/1993 | Lu | |
| 5,264,278 A | 11/1993 | Mazurek | |
| 5,279,689 A * | 1/1994 | Shvartsman | 156/220 |
| 5,279,912 A | 1/1994 | Telfer | |
| 5,308,737 A | 5/1994 | Bills | |
| 5,326,619 A | 7/1994 | Dower | |
| 5,330,799 A | 7/1994 | Sandor | |
| 5,355,188 A | 10/1994 | Biles | |
| 5,359,454 A | 10/1994 | Steenblik | |
| 5,360,694 A | 11/1994 | Thien | |
| 5,364,740 A | 11/1994 | Fohrenkamm | |
| 5,449,200 A | 9/1995 | Andric et al. | |
| 5,449,597 A | 9/1995 | Sawyer | |
| 5,455,689 A | 10/1995 | Taylor | |
| 5,459,016 A | 10/1995 | Debe | |
| 5,491,045 A | 2/1996 | DeBoer | |
| 5,503,902 A | 4/1996 | Steenblik | |
| 5,506,300 A | 4/1996 | Ward et al. | |
| 5,514,730 A | 5/1996 | Mazurek et al. | |
| 5,521,035 A | 5/1996 | Wolk | |
| 5,554,432 A | 9/1996 | Sandor | |
| 5,589,246 A | 12/1996 | Calhoun | |
| 5,594,841 A | 1/1997 | Schutz | |
| 5,639,580 A | 6/1997 | Morton | |
| 5,642,226 A | 6/1997 | Rosenthal | |
| 5,644,431 A | 7/1997 | Magee | |
| 5,671,089 A | 9/1997 | Allio | |
| 5,680,171 A | 10/1997 | Lo | |
| 5,681,676 A | 10/1997 | Telfer | |
| 5,685,939 A | 11/1997 | Wolk | |
| 5,689,372 A | 11/1997 | Morton | |
| 5,691,846 A | 11/1997 | Benson | |
| 5,706,133 A | 1/1998 | Orensteen | |
| 5,712,731 A | 1/1998 | Drinkwater | |
| 5,717,844 A | 2/1998 | Lo | |
| 5,738,746 A | 4/1998 | Billingsley | |
| 5,744,291 A | 4/1998 | Ip | |
| 5,757,550 A | 5/1998 | Gulick, Jr. | |
| 5,770,124 A | 6/1998 | Marecki | |
| 5,828,488 A | 10/1998 | Ouderkirk et al. | |
| 5,837,347 A | 11/1998 | Marecki | |
| 5,843,617 A | 12/1998 | Patel | |
| 5,850,278 A | 12/1998 | Lo | |
| 5,850,580 A | 12/1998 | Taguchi | |
| 5,856,061 A | 1/1999 | Patel | |
| 5,877,895 A | 3/1999 | Shaw et al. | |
| 5,882,774 A | 3/1999 | Jonza et al. | |
| 5,889,118 A | 3/1999 | Delgado | |
| 5,894,069 A | 4/1999 | Wen | |
| 5,896,230 A | 4/1999 | Goggins | |
| 5,935,758 A | 8/1999 | Patel | |
| 5,945,249 A | 8/1999 | Patel | |
| 5,986,781 A | 11/1999 | Long | |
| 5,994,026 A | 11/1999 | DeBoer | |
| 6,019,287 A | 2/2000 | Mann | |
| 6,028,621 A | 2/2000 | Yakubovich | |
| 6,033,810 A * | 3/2000 | Taniguchi et al. | 430/2 |
| 6,057,067 A | 5/2000 | Isberg | |
| 6,069,680 A | 5/2000 | Kessler | |
| 6,084,713 A | 7/2000 | Rosenthal | |
| 6,092,465 A | 7/2000 | Agronin | |
| 6,095,566 A | 8/2000 | Yamamoto et al. | |
| 6,110,645 A | 8/2000 | DeBoer | |
| 6,177,217 B1 | 1/2001 | Agostinelli et al. | |
| 6,197,474 B1 | 3/2001 | Niemeyer | |
| 6,212,805 B1 | 4/2001 | Hill | |
| 6,222,650 B1 | 4/2001 | Long | |
| 6,228,555 B1 | 5/2001 | Hoffend, Jr. | |
| 6,242,152 B1 | 6/2001 | Staral | |
| 6,280,891 B2 | 8/2001 | Daniel et al. | |
| 6,285,001 B1 | 9/2001 | Fleming | |
| 6,286,873 B1 | 9/2001 | Seder | |
| 6,288,842 B1 | 9/2001 | Florczak | |
| 6,291,143 B1 | 9/2001 | Patel | |
| 6,300,502 B1 | 10/2001 | Kannan | |
| 6,316,153 B1 * | 11/2001 | Goodman et al. | 430/8 |
| 6,351,537 B1 | 2/2002 | Dovgodko et al. | |
| 6,369,844 B1 | 4/2002 | Neumann | |
| 6,369,911 B1 | 4/2002 | Hattori | |
| 6,377,238 B1 | 4/2002 | McPheters | |
| 6,388,043 B1 | 5/2002 | Langer et al. | |

(56) References Cited

U.S. PATENT DOCUMENTS

| | | |
|---|---|---|
| 6,398,270 B1 | 6/2002 | Fukui et al. |
| 6,468,715 B2 | 10/2002 | Hoffend, Jr. |
| 6,478,432 B1 | 11/2002 | Dyner |
| 6,531,230 B1 | 3/2003 | Weber et al. |
| 6,552,830 B2 | 4/2003 | Long |
| 6,602,578 B1 | 8/2003 | Tompkin et al. |
| 6,729,655 B1 | 5/2004 | Dorricott et al. |
| 6,781,733 B1 | 8/2004 | Hira |
| 6,791,723 B1 | 9/2004 | Vallmajo |
| 6,919,892 B1 | 7/2005 | Cheiky |
| 7,006,294 B2 | 2/2006 | Steenblik |
| 7,054,042 B2 | 5/2006 | Holmes et al. |
| 7,068,434 B2 | 6/2006 | Florczak |
| 7,165,959 B2 | 1/2007 | Humlicek |
| 7,196,822 B2 | 3/2007 | Hu |
| 7,246,824 B2 | 7/2007 | Hudson |
| 7,253,958 B2 | 8/2007 | Aizenberg et al. |
| 7,255,909 B2 | 8/2007 | Mann et al. |
| 7,265,904 B2 | 9/2007 | Schilling |
| 7,333,268 B2 | 2/2008 | Steenblik et al. |
| 7,336,422 B2 | 2/2008 | Dunn |
| 7,583,444 B1 | 9/2009 | DeVoe |
| 7,586,685 B2 | 9/2009 | Dunn |
| 7,591,415 B2 | 9/2009 | Jesme |
| 7,616,332 B2 | 11/2009 | Kenner |
| 7,648,744 B2 | 1/2010 | Kuo et al. |
| 7,800,825 B2 | 9/2010 | Brooks |
| 2002/0054434 A1 | 5/2002 | Florczak |
| 2002/0126396 A1 | 9/2002 | Dolgoff |
| 2002/0145807 A1 | 10/2002 | Nishikawa |
| 2003/0116630 A1 | 6/2003 | Carey |
| 2004/0012872 A1* | 1/2004 | Fleming et al. ............... 359/885 |
| 2004/0038822 A1 | 2/2004 | Tutt et al. |
| 2004/0067451 A1* | 4/2004 | DeVoe et al. ................. 430/322 |
| 2005/0002074 A1 | 1/2005 | McPheters |
| 2005/0057812 A1 | 3/2005 | Raber |
| 2005/0142468 A1 | 6/2005 | Blood et al. |
| 2005/0142469 A1 | 6/2005 | Blood et al. |
| 2005/0161512 A1 | 7/2005 | Jones et al. |
| 2005/0180012 A1 | 8/2005 | Smith |
| 2006/0029753 A1 | 2/2006 | Kuo |
| 2006/0129489 A1 | 6/2006 | Hersch et al. |
| 2006/0134259 A1 | 6/2006 | Erickson |
| 2006/0209412 A1 | 9/2006 | Schilling et al. |
| 2006/0262411 A1 | 11/2006 | Dunn et al. |
| 2007/0081254 A1 | 4/2007 | Endle |
| 2007/0115555 A1 | 5/2007 | Nellissen |
| 2007/0132227 A1 | 6/2007 | Dean |
| 2007/0196616 A1 | 8/2007 | Stalder et al. |
| 2007/0278194 A1 | 12/2007 | Hoelsher |
| 2007/0284169 A1 | 12/2007 | Zabiega |
| 2007/0284546 A1 | 12/2007 | Ryzi et al. |
| 2008/0023890 A1 | 1/2008 | Sherman |
| 2008/0024872 A1 | 1/2008 | Dunn |
| 2008/0027199 A1 | 1/2008 | Mazurek |
| 2008/0037131 A1 | 2/2008 | Steenblik et al. |
| 2008/0118862 A1 | 5/2008 | Dunn |
| 2008/0130126 A1 | 6/2008 | Brooks |
| 2009/0310824 A1 | 12/2009 | Kenner |
| 2010/0103527 A1 | 4/2010 | Endle |
| 2010/0103528 A1 | 4/2010 | Endle |
| 2010/0164910 A1 | 7/2010 | Tomisawa |
| 2010/0182666 A1 | 7/2010 | Herbert |

FOREIGN PATENT DOCUMENTS

| | | |
|---|---|---|
| CA | 2 400 897 | 2/2003 |
| DE | 198 04 997 | 2/1999 |
| EP | 0 175 504 | 3/1986 |
| EP | 0 203 752 | 5/1986 |
| EP | 0 314 134 | 5/1989 |
| EP | 0 363 919 | 1/1990 |
| EP | 0 404 004 | 12/1990 |
| EP | 0 583 766 | 2/1994 |
| EP | 0 658 443 | 6/1995 |
| EP | 0 673 785 | 9/1995 |
| EP | 0 743 552 | 11/1996 |
| EP | 0 655 347 | 9/1997 |
| EP | 0 615 860 | 8/1998 |
| EP | 1 079 274 | 2/2001 |
| EP | 1 130 541 | 9/2001 |
| EP | 1 909 255 | 4/2008 |
| EP | 1 836 688 | 8/2008 |
| GB | 1 308 116 | 2/1973 |
| GB | 1 433 025 | 4/1976 |
| GB | 2 083 726 | 3/1982 |
| JP | 61-261701 | 11/1986 |
| JP | 64-065153 | 3/1989 |
| JP | 01-181083 | 12/1989 |
| JP | 03-068610 | 3/1991 |
| JP | 03-068611 | 3/1991 |
| JP | 04-309583 | 11/1992 |
| JP | 05-188499 | 7/1993 |
| JP | 06-308895 | 11/1994 |
| JP | 07-140571 | 6/1995 |
| JP | 07-281327 | 10/1995 |
| JP | 09-253275 | 3/1996 |
| JP | 10-186276 | 7/1998 |
| JP | 11-500236 | 1/1999 |
| JP | 01-116917 | 4/2001 |
| JP | 2003-524105 | 8/2003 |
| JP | 2004-503832 | 2/2004 |
| KR | 10-2002-0086566 | 11/2002 |
| WO | WO 83/03019 | 9/1983 |
| WO | WO 94/16392 | 7/1994 |
| WO | WO 94/20583 | 9/1994 |
| WO | WO 95/26281 | 10/1995 |
| WO | WO 96/24867 | 8/1996 |
| WO | WO 97/15173 | 4/1997 |
| WO | WO 97/46631 | 12/1997 |
| WO | WO 99/37949 | 7/1999 |
| WO | WO 99/42147 | 8/1999 |
| WO | 01/96962 | 12/2001 |
| WO | WO 02/22376 | 3/2002 |
| WO | WO 03/005075 | 1/2003 |
| WO | WO 03/022598 | 3/2003 |
| WO | WO 03/061983 | 7/2003 |
| WO | WO 01/63341 | 11/2003 |
| WO | WO 03/093341 | 11/2003 |
| WO | WO 2004/111706 | 12/2004 |
| WO | WO 2005/106601 | 11/2005 |
| WO | WO 2006/125224 | 11/2006 |
| WO | 2006/130995 | * 12/2006 |
| WO | WO 2007/018111 | 2/2007 |
| WO | 2010/077454 | 7/2010 |

OTHER PUBLICATIONS

3M Security Systems Division, Product Fact Sheet, 3M™ Inspection Reader, © 3M 2004, 2 pages.

3M Security Systems Division, Product Fact Sheet, 3M™ ePassport Reader, © 3M 2004, 6 pages.

3M Security Systems Division, Product Fact Sheet, 3M™ Full-Page Reader, © 3M 2004, 6 pages.

Arnott, S.R., et al., "Attention switching in depth using random-dot autostereograms: Attention gradient asymmetries." Perception and Psychophysics, 62(7), pp. 1459-1473, 2000.

Backus, B., et al., "Human Cortical Activity Correlates With Stereoscopic Depth Perception", The American Physiological Society, J. Neurophysiol, Stereo Depth Perception and Cortical Activity, vol. 86, pp. 2054-2068, Oct. 2001.

Ballard, D. and Brown, C., "Computer Vision", Prentice Hall, Inc., 1982, pp. 65-70.

Chau, A.W., et al., "Segregation by color and stereoscopic depth in three-dimensional visual space." Perception and Psychophsics, 57(7), pp. 1032-1044, 1995.

Dudknikov, Yu. A. and B.K. Rozhkov, and E.N. Antipova, "Obtaining a Portrait of a Person by the Integral Photography Method," Dec. 20, 1979, pp. 562-563, Sov. J. Opt. Technol. 47(9), Sep. 1980, © 1981 The Optical Society of America.

(56) References Cited

OTHER PUBLICATIONS

Dudknikov, Yu. A. and B.K. Rozhkov, "Selecting the Parameters of the Lens-Array Photographing System in Integral Photography," Feb. 24, 1977, pp. 349-351, Sov. J. Opt. Technol. 45(6), Jun. 1978, © 1979 The Optical Society of America.

Dudknikov, Yu. A. and B.K. Rozhkov, "Raster 3D Imaging Systems," Leningrad, Mashinostroyeniye, Ch. 4, pp. 102-173; Sections 5.5-5.9, pp. 190-209, Nov. 1986.

Factiva WireWatch Message, "Shape-memory polymers offer new twist on applications", *Modern Plastics International, Chemical Business NewsBase*, Apr. 24, 2003.

Gugerty, L.J., "Situation Awareness during Driving: Explicit and Implicit Knowledge in Dynamic Spatial Memory" Journal of Experimental Psychology: Applied, vol. 3, No. 1, pp. 42-66, 1997.

He, Z.J. et al., "Surfaces versus features in visual search." Nature, 359(6392), pp. 231-233, 1992.

Kasai, T. et al., "Attending to a location in three-dimensional space modulates early ERPs." Cognitive Brain Research, 17(2), pp. 273-285, 2003.

Kim , "Polyurethanes having shape memory effects", *Polymer*, vol. 37 No. 26, pp. 5781-5793, 1996.

Lendlein et al., "Shape-Memory Polymers as Stimuli-Sensitive Implant Materials", Clinical Hemorheology and Microcirculation, IOS Press, Amsterdam, NL, vol. 32, No. 2, pp. 105-116, Jan. 1, 2005.

Lendlein et al., "AB-polymer networks based on oligo(ε-caprolactone) segments showing shape-memory properties", PNAS, vol. 98, No. 3, pp. 842-847, 2001.

Lendlein and Kelch, "Shape-memory polymers", Angew. Chem. Int. Ed. 2002, 41, pp. 2034-2057.

Lendlein and Langer, "Biodegradable, elastic shape-memory polymers for potential biomedical applications", Science, vol. 296, pp. 1673-1676, 2002.

Mazurek et al., "Novel materials based on silicone-acrylate copolymer networks", *Journal of Applied Polymer Science*, vol. 80, pp. 159-180, 2001.

Mazza, V. et al., "Foreground-background segmentation and attention: A change blindness study." Psychological Research, 69(3), pp. 201-210, 2005.

Nakayama, K. et al., "Serial and parallel processing of visual feature conjunctions", Nature, 320(6059), pp. 264-265, 1986.

O'Toole, A.J. et al., "On the preattentive accessibility of stereoscopic disparity: Evidence from visual search." Perception and Psychophysics, 59(2), pp. 202-218, 1997.

Pai, V.M. "Microscopic flow visualization system for fluids in magnetic field", Journal of Magnetism and Magnetic Materials, vol. 194, No. 1-3, Apr. 1999, pp. 262-266.

Pearson, James J., "Processing and Display of Three-Dimensional Data II", Proceedings of SPIE, vol. 507, 6 pages, San Diego, Aug. 23-24, 1984.

Puhakka, M. et al., "Does preknowledge of target depth affect visual processing?" Journal of Vision, vol. 3, No. 9, p. 599, 2003.

Rothrock, L. et al., "Applying the Proximity Compatibility and the Control-Display Compatibility Principles to Engineering Design Interfaces", Human Factors and Ergonomics in Manufacturing, 16 (1), pp. 61-81, 1995.

Rumar, K., "The basic driver error: Late detection." Ergonomics, 33(10-11), pp. 1281-1290, 1990.

Search Report for International Application No. PCT/US2008/082951, 3 pages.

Strayer, D.L. et al., "Cell Phone-Induced Failures of Visual Attention During Simulated Driving." Journal of Experimental Psychology: Applied, vol. 9, No. 1, pp. 23-32, 2003.

U.S. Appl. No. 61/158,827, entitled "User Interface with a Composite Image That Floats", filed Mar. 10, 2009.

U.S. Appl. No. 60/949,092, entitled "Sheeting with Composite Image That Floats", filed Jul. 11, 2007.

U.S. Appl. No. 12/257,182, filed Oct. 23, 2008, entitled "Methods of Forming Sheeting with Composite Images that Float and Sheeting with Composite Images that Float".

U.S. Appl. No. 13/092,165, entitled "Methods for Changing the Shape of a Surface of a Shape Memory Polymer Article", filed Apr. 22, 2011.

Weekly Reports of the Meetings of the Academy of Science Published, in Accordance with an Academy Decision dated Jul. 13, 1835, by Madams the Perpetual Secretaries. vol. 146, Jan.-Jun. 1908, Paris, pp. 446-451.

Wickens, C. and Carswell, C., "The proximity compatibility principle: its psychological foundation and relevance to display design." Human Factors, vol. 37 (3), pp. 473-494, 1995.

Wolfe, J. and Horowitz, T., "What attributes guide the development of visual attention and how do they do it?" Nature Reviews Neuroscience, vol. 5 (6), pp. 495-501, Jun. 2004.

Written Opinion for International Application No. PCT/US2008/082951, 3 pages.

\* cited by examiner

METHODS FOR FORMING SHEETING WITH A COMPOSITE IMAGE THAT FLOATS AND A MASTER TOOLING

CROSS REFERENCE TO RELATED APPLICATIONS

This application is a national stage filing under 35 U.S.C. 371 of PCT/US2008/082951, filed Nov. 10, 2008, which claims priority to U.S. Provisional Application No. 60/990,446, filed on Nov. 27, 2007, the disclosure of which is incorporated by reference in its/their entirety herein.

FIELD OF THE INVENTION

The present invention relates to sheeting that provides one or more composite images that are perceived by an observer to be suspended in space relative to the sheeting, methods for making such sheeting, and master tooling structures for making such sheeting.

BACKGROUND

Sheeting materials having a graphic image or other mark have been widely used, particularly as labels for authenticating an article or document. For example, sheetings such as those described in U.S. Pat. Nos. 3,154,872; 3,801,183; 4,082,426; and 4,099,838 have been used as validation stickers for vehicle license plates, and as security films for driver's licenses, government documents, tape cassettes, playing cards, beverage containers, and the like. Other uses include graphics applications for identification purposes such as on police, fire or other emergency vehicles, in advertising and promotional displays and as distinctive labels to provide brand enhancement.

One type of imaged sheeting is disclosed in U.S. Pat. No. 6,288,842 and U.S. Pat. No. 7,068,434. These two patents disclose microlens sheeting with composite images, in which the composite image floats above or below the sheeting, or both. The composite image may be two-dimensional or three-dimensional. A laser impinging on a microlens array is focused at the backside of the array where a radiation sensitive coating is applied. Other microlens sheetings are formed when material is transferred onto the back of a microlens array, such as described in U.S. Published Patent Application 2007/0081254.

Each of these previously disclosed methods rely on the application of radiation from a laser or other radiation source to form each sheeting having a composite image.

U.S. Pat. No. 5,712,731, "Security Device for Security Documents Such as Bank Notes and Credit Cards," (Drinkwater et al.) discloses a security device that includes an array of microimages which, when viewed through a corresponding array of substantially spherical microlenses, generates a magnified image. In some cases, the array of microlenses is bonded to the array of microimages.

PCT Patent Application Publication, WO 03/061983 A1, "Micro-Optics For Article Identification" discloses methods and compositions for identification and counterfeit deterrence using non-holographic micro-optics and microstructures having a surface relief greater than a few micrometers.

BRIEF SUMMARY

In one embodiment, a method of forming a sheeting from a master tool is described. The method includes the step of providing a first sheeting comprising a first array of microlenses and a photopolymerizable first material layer adjacent to the first array of microlenses. A further step is exposing the first sheeting to a radiation source to form a master tool that includes polymerized first structured areas in the first material layer. At least some of the first structured areas have a portion shape in common with at least some of the other first structured areas, and each first structured area is associated with one of the first array of microlenses. A further step is replicating the plurality of first structured areas using a substance that conforms to the structured areas to form a second material layer having replicated structured areas.

In another embodiment, a master tool is described for forming a sheeting that has a composite image that floats above or below the sheeting. The master tool includes a first sheeting have a first array of microlenses and a photopolymerized first material layer adjacent to the first array of microlenses. The photopolymerized material is polymerized upon exposure to conditions resulting in simultaneous absorption of two or more photons. The first sheeting includes polymerized structured areas in the first material layer. At least some of the structured areas have a portion shape in common with at least some of the other structured areas and each structured area is associated with one of the first array of microlenses.

In another embodiment, a method is described of using a master tool to form a sheeting. The method includes a step of providing a first sheeting comprising a first array of microlenses and a photopolymerizable first material layer adjacent to the first array of microlenses. The photopolymerizable material is polymerized upon exposure to conditions resulting in simultaneous absorption of two or more photons. A further step of the method is exposing the first sheeting to a radiation source to form a master tool including polymerized first structured areas in the first material layer, where at least some of the first structured areas have a portion shape in common with at least some of the other first structured areas, and where each first structured area is associated with one of the first array of microlenses. Yet another step is replicating the plurality of first structured areas using a substance that conforms to the plurality of structured areas to form a second material layer having a plurality of replicated structured areas.

In another embodiment, a master tool is described including a first array of microlenses and a regular array of structures. Each structure is associated with one of the microlenses, and at least some of the structures include a portion shape in common with at least some of the other structures. Substantially flat areas exist between the structures such that in the substantially flat areas there is no variation in feature height greater than 100 nanometers.

In yet another embodiment, a photolithography process using visible or infrared radiation, includes a first step of providing a first array of microlenses and a photopolymerizable first material layer adjacent to the microlenses. Another step is exposing the first material layer to a visible or infrared radiation source. A further step is developing the photopolymerizable first material layer to form a master tool comprising a plurality of polymerized first structured areas in the first material layer. At least some of the first structured areas include a portion shape in common with some of the other first structured areas. Each first structured area is associated with one of the first array of microlenses. At least one feature dimension of a plurality of the first structured areas is less than or equal to 100 nanometers.

These and other aspects of the present application will be apparent from the detailed description below. In no event, however, should the above summaries be construed as limi-

BRIEF DESCRIPTION OF THE DRAWINGS

Throughout the specification, reference is made to the appended drawings, where like reference numerals designate like elements.

DETAILED DESCRIPTION OF THE ILLUSTRATIVE EMBODIMENTS

The present invention is applicable to sheeting that provides one or more composite images that are perceived by an observer to be suspended in space relative to the sheeting. The composite image is a combination or composite of the shapes of individual structures associated with a number of microlenses. Optical assemblies of this type are particularly useful in the context of labels for authenticating an article or document.

Figure 1:
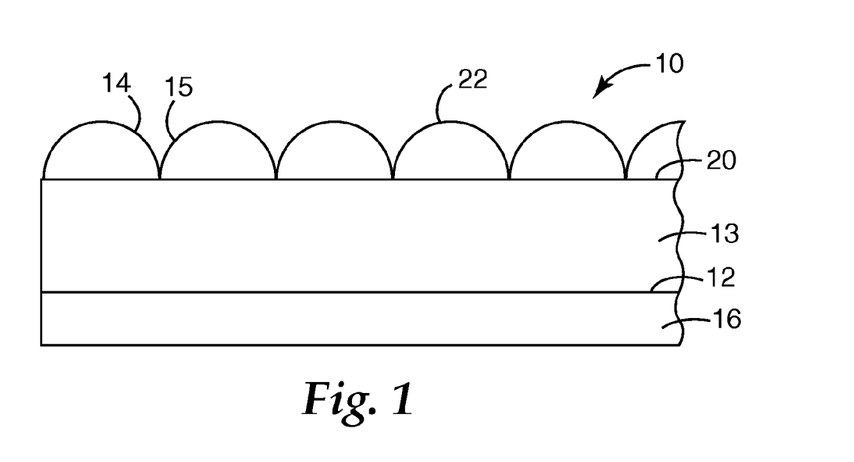
FIG. 1 is an enlarged cross sectional view of a sheeting that includes a microlens array and a polymerizable material.

One embodiment of a microlens sheeting of the present invention provides a composite image, provided by individual structures associated with a number of the microlenses, that appears to be suspended, or to float, above, in the plane of, and/or below the sheeting. An example of a microlens sheeting 10 is illustrated in FIG. 1, and will be further described herein. The microlens sheeting includes an array of microlenses 14 formed on a substrate 13. Adjacent to the substrate 13 is a layer of material 16 which is photopolymerizable.

Figure 2:
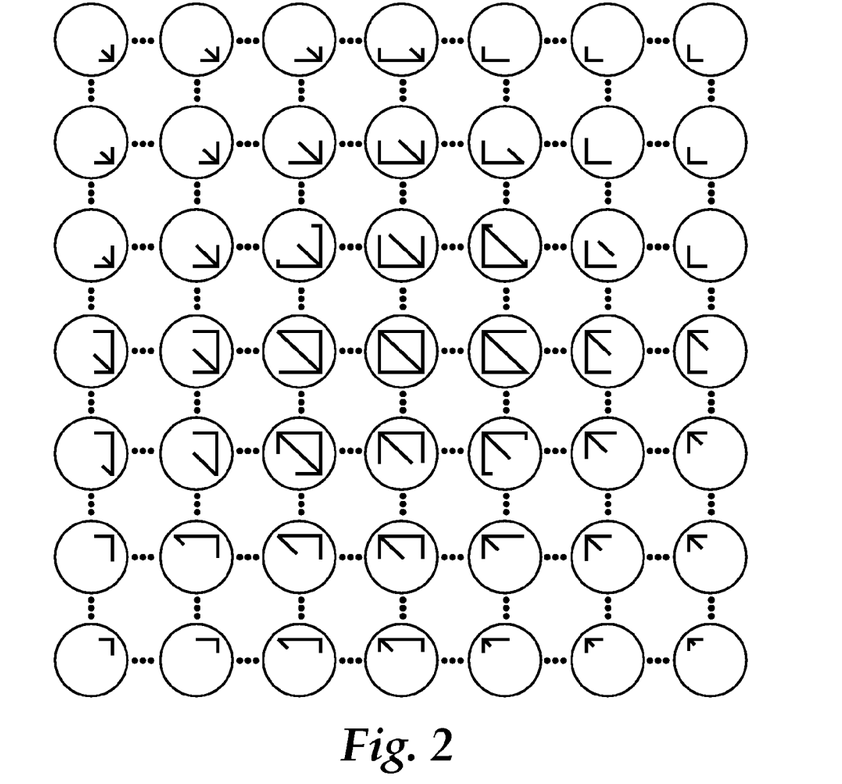
FIG. 2 is a plan view of a section of a microlens sheeting depicting sample images recorded in the material layer adjacent individual microlenses, and further showing that the recorded images range from complete replication to partial replication of the composite image.

Some examples of microlens sheetings that form composite images are described in U.S. Pat. No. 7,068,434, for example. In the method of formation described in U.S. Pat. No. 7,068,434, a microlens sheet is exposed to radiation to form an array of partially complete images associated with individual microlenses. FIG. 2 illustrates an example of such an array of partially complete images. When an array of partially complete images or structures is viewed by an observer through the microlens array, the composite image appears to be suspended, or to float, above, in the plane of and/or below the sheeting.

The composite image is a combination or composite of all of the shapes of the partially complete individual structures. The partially complete structures each include at least one shape portion in common with the composite image. As can be seen in FIG. 2, many of the partially complete structures have a portion of their shape in common with other partially complete structures. The structure in the middle of FIG. 2, a rectangle with a diagonal line from one corner to another, is a complete structure whose shape is identical to the composite image that will be formed by the combination of partially complete structures surrounding it.

Images that float below the plane of the sheeting are often referred to as sinking images. However, the term "floating" will be used in the description herein when the image sinks below the plane of the sheeting, when the image floats above the plane of the sheeting, and when the image floats in the plane of the sheeting. Some images appear to have a part floating above the plane of the sheeting and a part floating below the plane of the sheeting. If a specific position of the image is intended with respect to the sheeting that will be described along with the use of the term "floating."

In the method of formation described in U.S. Pat. No. 7,068,434, each sheeting is individually formed. Radiation is applied each time a sheeting with a composite image is desired to be formed. The typical source of radiation is a laser. During the process of exposing the sheeting to radiation, the sheeting or laser is moved in order to create the desired shape of the composite image. Lower cost methods for creating the sheeting are needed.

A new manufacturing process for sheeting has been developed to address this need. The new process takes advantage of lower cost microreplication technologies using a conformable material. First, a master sheeting is created from a sheeting with a photopolymerizable layer of material. In order to form the master sheeting, the sheeting is exposed to radiation to form an array of first structured areas. Then the sheeting can be replicated using a conformable material to form a second material layer having an array of replicated structured areas. When the second material layer is mated with an array of microlenses, a second sheeting is formed, where a composite image appears to be suspended, or to float, above, in the plane of and/or below the sheeting. The composite image is a combination of the shapes of the first structured areas. This improved manufacturing method only requires the exposure to a radiation source and precise movement of the sheeting with respect to the laser during the formation process for the master sheeting. These steps are not needed to generate additional sheetings from the master sheeting.

Figure 3:
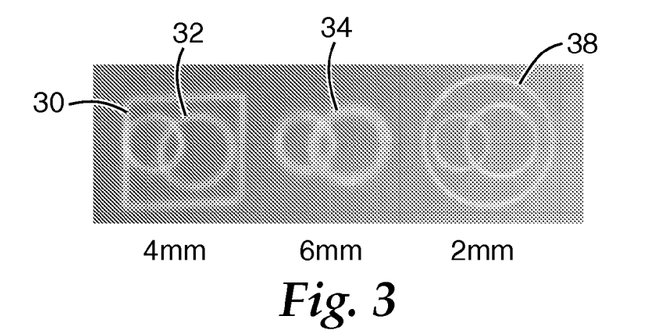
FIG. 3 is a photograph of a microlens sheeting with a radiation sensitive material layer made of a polymerizable material that has been exposed to provide composite images of intersecting rings, where one ring appears to float above and one ring appears to float below the sheeting.
Figure 4:
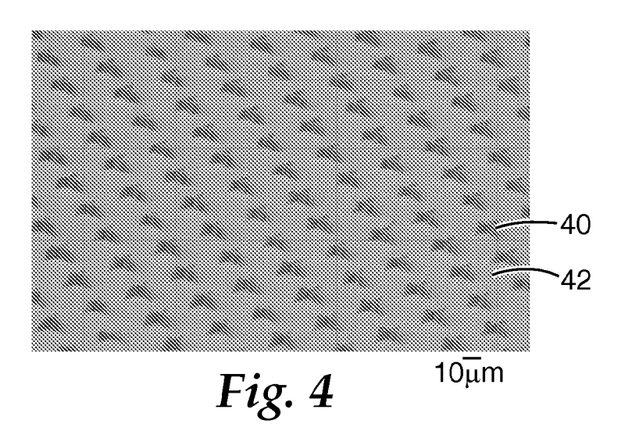
FIG. 4 is a scanning electron microscope (SEM) image of a portion of the microlens sheeting of FIG. 3 which includes an array of partially complete structures.

FIG. 3 is a photograph of a composite image 30 of intersecting circles within a rectangle formed by one embodiment of a sheeting. FIG. 4 is an image taken with a scanning electron microscope (SEM) of a portion 32 of the microlens sheeting of FIG. 3 which includes an array of partially complete structures, while FIGS. 5 and 6 show just one of the partially complete structures of the sheeting of FIG. 3, from a top and perspective view, respectively.

The new method uses photopolymerization of a resist material layer to form the partially structured areas. In some embodiments, a two-photon polymerization process is used to create sharp, crisp structured areas, as will be further described herein. Because the structured areas of the master sheeting are more precise with this process than with one-photon polymerization methods, the replicated structured areas are well-defined with a narrow feature width.

Figure 5:
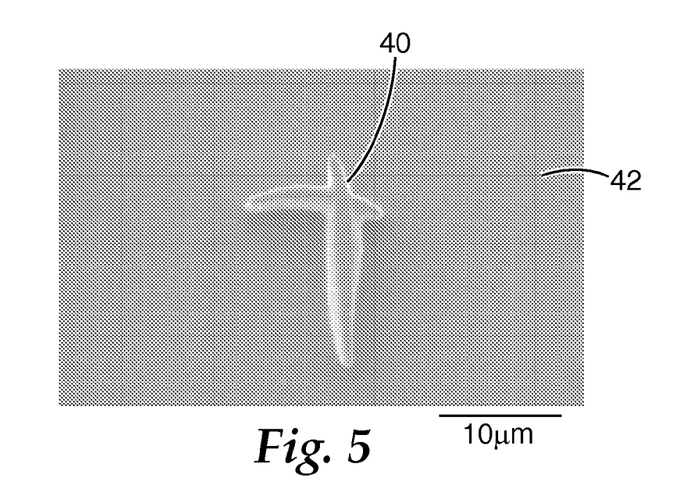
FIG. 5 is an SEM image from a top view of a portion of the microlens sheeting of FIG. 4 illustrating a single partially complete structure.
Figure 6:
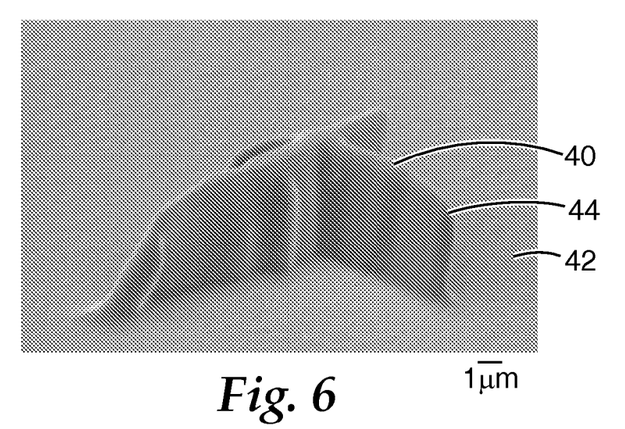
FIG. 6 is an SEM image from a perspective view of the single partially complete structure of FIG. 5.

The microlens sheeting of FIGS. 4-6 includes structured areas 40, many of which are partially complete structures compared to the composite image 30. In some embodiments, substantially flat areas 42 exist between the structured areas 40. In some embodiments, in the substantially flat areas 42, there is no variation in feature height greater than 100 nanometers. The group of structured areas or structures 40 has a maximum structure height. In some embodiments, there is no feature in the substantially flat areas 42 that has a height greater to or equal to 10% of the maximum structure height. The narrow feature width is evident in FIGS. 4-6. In some embodiments, at least one feature dimension of the structured areas is less than or equal to 100 nanometers. Examples of feature dimensions include width, height or length measurements of portions of the structures 40. For example, a narrowest width of a ridge such as ridge 44 of structure 40 in FIG. 6 is less than or equal to 100 nanometers in one embodiment.

To provide a complete description of the invention, an exemplary process and equipment for forming the master sheeting will be described in Part I below, followed by a description of the photo polymerizable material in Part II below, a description of the microlens sheeting constructions and substrate layer in Part III below, and a description of radiation sources and systems in Part IV. The microreplication process will be described in Part V. Several examples are also provided to further explain various embodiments of the present invention in Part VI.

I. Forming the Master Sheeting and Equipment for Forming the Master Sheeting

An exemplary process for forming a master sheeting includes directing collimated light from a laser through a lens toward the microlens sheeting. To create a sheeting having a floating image, as described further below, the light is transmitted through a lens to produce a cone of divergent or convergent light. A lens with a high numerical aperture (NA), equal to or greater than 0.3, is used to produce a cone of divergent light.

Figure 7:
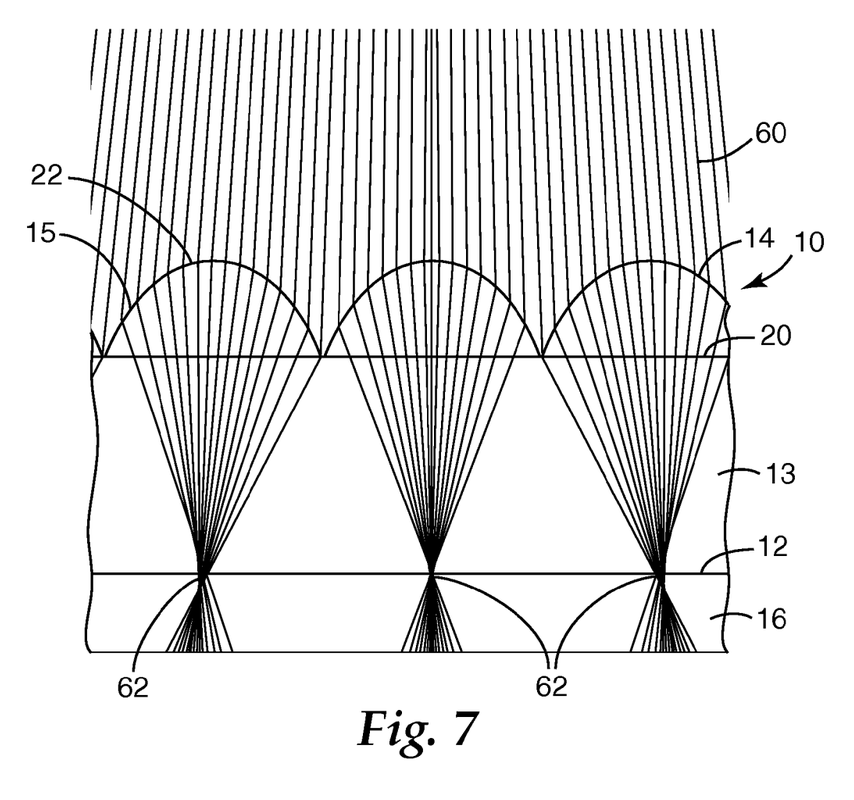
FIG. 7 is an enlarged cross sectional view of radiation impinging upon a sheeting that includes a microlens array and a polymerizable material.

One embodiment of the sheeting 10, as illustrated in FIGS. 1 and 7, is made up of a substrate 13 having microlenses 14 formed on a first side 20 of the substrate and a photopolymerizable material layer 16 on a second side 12 of the substrate. FIG. 7 illustrates divergent light impinging on an enlarged cross-section of a portion of a sheeting 10.

The material layer 16 side of the sheeting 10 is positioned away from the microlens, so that the axis of the cone of light (the optical axis) is perpendicular to the plane of the sheeting.

The array of microlenses 14 includes individual microlenses 22. If the focus spot of each microlens 22 is in the material layer 16 and the radiation is of sufficient energy and intensity to cause a chemical change to the material layer, a polymerized feature will remain after subsequent development of the material layer. As seen in FIG. 7, the focal spot 62 of the radiation 60 is at or near the substrate/material layer interface 12 to keep the polymerized areas adhered to the substrate and not washed away during development.

Figure 8:
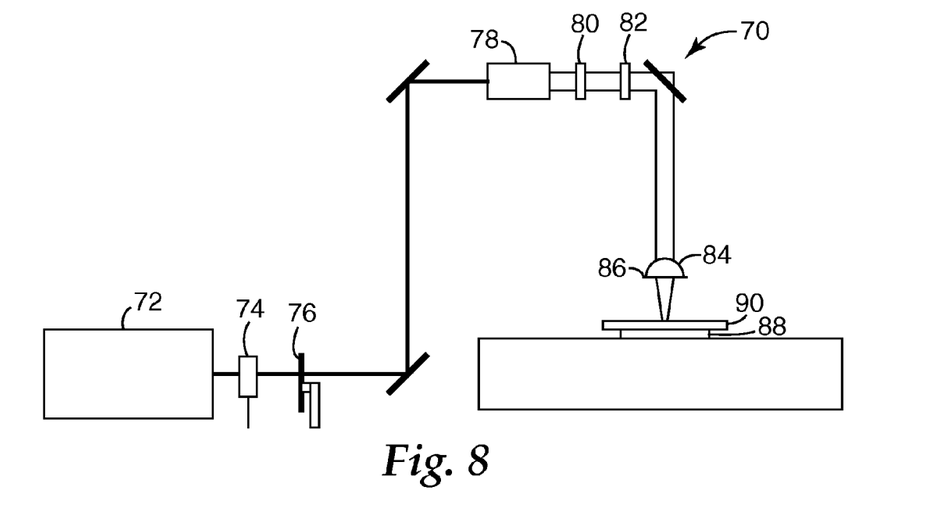
FIG. 8 is a schematic representation of a laser system for creating radiation and forming the master tooling.

FIG. 8 is a schematic representation of one embodiment of a radiation system 70 for creating radiation and forming the master tooling. Though this embodiment of a laser system 70 and a method for forming a master sheeting will now be described, other embodiments of the radiation source, radiation system, sheeting construction, and processing steps will be discussed herein, in the sections to follow. A laser 72, shutter 74 and variable power control unit 76 direct radiation to a beam expander 78. The power of the laser 72 is continually varied with respect to the focus height of the objective lens 84. Progressively higher power is required during imaging as the float/sink height is increased. The range of the light intensity can be further controlled using a neutral density filter wheel 80. The beam expander 78 and variable aperture 82 are used to control the numeric aperture (NA) of the aspheric objective lens 84 used to focus the light incident on the lens array, which ultimately effects the viewing angle of the image. A typical beam diameter is about 12 mm. The objective lens 84 is positioned on a Z-stage 86 which varies the distance between the objective lens 84 and the sheeting 90 during writing of the image to vary the float/sink height of image features. The sheeting 90 is positioned on an XY stage, which is moved to draw the image.

The steps of one embodiment of forming a master sheeting will now be described, starting with providing a substrate. Many variations on the method steps and materials of this embodiment are possible, as will be further discussed herein. In order to form the microlenses, the first side 20 of the substrate 13 is coated with a microlens material such as urethane methacrylate. The second side 12 of the substrate is coated with a polymerizable material layer. The microlenses are microreplicated from the microlens material layer with a tooling roll containing depressions with the desired shape. The focal point 62 of the microlenses is at or near the interface between the substrate and the material layer 16. The sheeting is positioned on the stage 88.

Next, the laser is activated. The power of the laser 72 is varied to form the different float/sink heights of the features. More power is required to form greater float/sink heights. The laser, Z-stage 86 and the X-Y stage 88 are moved relative to each other so that the laser writes the composite image.

After the exposure to the laser radiation, the sheeting is developed for a period of time using a solvent that is appropriate for the material layer 16. The polymerizable material that was not exposed to the required level of radiation is washed away, leaving an array of structured areas, where at least one of the structured areas is a partial structure of the composite structure. In fact, most of the array of structured areas will be a partial structure of the composite structure.

In some embodiments, the master sheeting produces a composite image that appears to float above or below a plane of the master sheeting. In such a master sheeting, each of the array of microlenses has a refractive surface that transmits light to a position of the material layer to produce, under reflected or transmitted light, a composite image from the structured areas formed within the material layer. The composite image appears to float above or below the master sheeting. In other embodiments, however, the composite image may not be visible upon observation of the master sheeting, even though the composite image is visible in the replicated sheetings. This could occur if a polymerizable material was used that could be exposed in a way that produced structured areas with very low or no reflectivity. In this situation, the composite image may not be easily viewable in transmitted or reflected light from the master sheeting.

In various embodiments, at least one of the structured areas of the master sheeting has a dimension that protrudes above a plane of the master sheeting or is recessed below the plane of the master sheeting by at least 0.5 micrometer or at least 1 micrometer. In other embodiments, at least one of the structured areas protrudes or is recessed by at least 2 micrometers or at least 4 micrometers.

II. Photopolymerizable Material Options

Many different types of material are useable for the layer of material 16. In one embodiment, the photopolymerized material is polymerized upon exposure to conditions resulting in simultaneous absorption of two or more photons. Two-photon polymerizable material is characterized by a non-linear photo polymerization process. Curing of the material follows the square of the electric field intensity. This requires the electric field of the focused light to be strong enough to ensure a reasonable probability of absorption of a second photon by the excited molecule produced by the absorption of the first photon before the first absorbed photon is re-emitted. As a result, in a two-photon process, polymerization takes place only in the immediate vicinity of the focus spot. Scattered light, having a relatively low intensity, will simply pass through the resist without effect.

It is also possible for a single-photon process to be used. However, in a single-photon process, any scattered light of the right wavelength can initiate curing, as the dose required for polymerization is a linear function of fluence and time.

Examples of two-photon polymerizable materials are described in co-pending, commonly owned Patent Application having application Ser. No. 11/313,482, filed Dec. 21, 2005.

The following terms are useful in discussing the photopolymerizable material of a sheeting with a composite image:

"multiphoton absorption" means simultaneous absorption of two or more photons to reach a reactive, electronic excited state that is energetically inaccessible by the absorption of a single photon of the same energy;

"photosensitizer" means a molecule that lowers the energy required to activate a photoinitiator by absorbing light of lower energy than is required by the photoinitiator for activation and interacting with the photoinitiator to produce a photoinitiating species therefrom; and "simultaneous" means two events that occur within the period of $10^{-12}$ seconds or less.

The process of using a two-photon polymerizable composition includes providing a photoreactive composition, where the photoreactive composition includes at least one reactive species that is capable of undergoing an acid- or radical-initiated chemical reaction, and at least one multiphoton photoinitiator system. The process further involves imagewise exposing at least a portion of the composition to light sufficient to cause simultaneous absorption of at least two photons, thereby inducing at least one acid- or radical-initiated chemical reaction where the composition is exposed to the light. The process further includes developing the composition by removing the resulting exposed portion, or the resulting non-exposed portion, of the composition. Optionally, after imagewise exposing at least a portion of the composition, nonimagewise exposure may be provided of at least a portion of the composition to light sufficient to effect reaction of at least a portion of any remaining unreacted photoreactive composition.

In one embodiment, the material layer 16 is at least 1 micrometer thick. In another embodiment the material layer is not more than 5 or 10 micrometers thick. In particular embodiments, the material layer 16 has a thickness of 1.5 micrometers, 1.7 micrometers and 4 micrometers.

It is possible to use either a negative resist material or a positive resist material. Throughout the application, the example of a negative resist material is usually discussed. If a positive resist material is used instead, the areas that are sufficiently radiated are removed during development and rinsing. After development and rinsing, the master sheeting would then have an array of first structured areas which include cavities in the shape of the desired second structured areas of the replicated sheeting.

III. Microlenses Array and Substrate

In one embodiment, the array of microlenses 14 are formed from urethane methacrylate using a tooling roll containing depressions with the desired shape. The layout of the array of microlenses may be a hexagonally packed array, a square array or other regular, repeating arrangements.

In various embodiments, the microlenses have a diameter of at least 10 micrometer, at least 20 micrometer, and at least 30 micrometer. In further embodiments, the microlenses have a diameter not exceeding 200 micrometer, 150 micrometer, or 100 micrometer. Particular microlens diameters that occur in specific embodiments are 30 micrometer and 150 micrometer.

The microlens array itself can be fabricated from discrete lenslets or by an etching process to produce a monolithic array of microlenses. Materials suitable for the microlenses are those that are non-absorbing at the wavelength of the incident energy. The individual microlenses in the array preferably have numerical apertures greater than 0.3 and diameters greater than 10 micrometers but less than 1 mm. Shapes of the individual lenslets in a monolithic array are chosen to have a high numerical aperture and provide a large fill factor of approximately greater than 60%.

The substrate is preferably optically clear and does not absorb laser radiation. In one embodiment, the substrate is about 2 mil thick and made of polyethylene teraphalate (PET). In other embodiments, the substrate is 5 mil thick. Alternate materials are also possible for the substrate, such as polyester.

IV. Radiation Sources and Radiation System

Any energy source providing radiation of the desired intensity and wavelength can be used with the method of the present invention. The intensity of the energy source is sufficient to be transmitted through a lens array without too much absorptive loss. The wavelength is chosen depending upon the polymerizable material. Devices capable of providing radiation having a wavelength of between 200 nanometer and 11 micrometers are believed to be particularly preferred. One example of a laser device that is suitable for use with some embodiments is available from Spectra-Physics Mountain View, Calif., under the trade name "HURRICANE", having a 1 kHz repetition rate, having a wavelength of 800 nm, 120 femtosecond pulse width, and an average power level of 1 Watt. Another useful laser is available from Spectra-Physics under the trade designation "MAI TAI", tunable to wavelengths in a range of from 750 to 850 nanometers, and having a repetition frequency of 80 megahertz, and a pulse width of about 100 femtoseconds ($1\times10^{-13}$ sec), with an average power level up to 1 Watt.

Suitable light sources include, for example, femtosecond near-infrared titanium sapphire oscillators (for example, those available from Coherent, Santa Clara, Calif., under the trade designation "MIRA OPTIMA 900-F") pumped by an argon ion laser (for example, those available from Coherent under the trade designation "INNOVA"). This laser, operating at 76 MHz, has a pulse width of less than 200 femtoseconds, is tunable between 700 and 980 nm, and has average power up to 1.4 Watts.

For a multi-photon process, any light source (for example, a laser) that provides sufficient intensity to effect multiphoton absorption at a wavelength appropriate for the multiphoton absorber used in the photoreactive composition can be utilized. Such wavelengths can generally be in the range of about 300 to about 1500 nm; preferably, from about 400 to about 1100 nm; more preferably, from about 600 to about 900 nm; more preferably, from about 750 to about 850 nm, inclusive. Typically, the light fluence (for example, peak intensity of a pulsed laser) is greater than about $10^6$ W/cm$^2$. The upper limit on the light fluence is generally dictated by the ablation threshold of the photoreactive composition.

Preferred light sources are near infrared pulsed lasers having a pulse length less than about $10^{-8}$ second (more preferably, less than about $10^{-9}$ second; most preferably, less than about $10^{-11}$ second). Other pulse lengths can be used as long as the peak intensity and ablation threshold criteria above are met. Pulsed radiation can, for example, have a pulse frequency of from about one kilohertz up to about 50 megahertz, or even more. Continuous wave lasers can also be used.

For energy sources in the ultraviolet, visible, and infrared portions of the electromagnetic spectrum, the light is controlled by appropriate optical elements, an example of which are shown in FIG. 8 and described in greater detail herein. In one embodiment, a requirement of this arrangement of optical elements, commonly referred to as an optical train, is that the optical train directs light toward the sheeting material with appropriate divergence or spread so as to irradiate the microlens and thus the material layer at the desired angles. The composite images of the present invention are preferably obtained by using light spreading devices with numerical apertures (defined as the sine of the half angle of the maximum diverging rays) of greater than or equal to 0.3. Light spreading devices with larger numerical apertures produce composite images having a greater viewing angle, and a greater range of apparent movement of the image.

The radiation system or optical system 70 can include, for example, refractive optical elements (for example, lenses or microlens arrays), reflective optical elements (for example, retroreflectors or focusing mirrors), diffractive optical elements (for example, gratings, phase masks, and holograms), polarizing optical elements (for example, linear polarizers and waveplates), dispersive optical elements (for example, prisms and gratings), diffusers, Pockels cells, waveguides, and the like. Such optical elements are useful for focusing, beam delivery, beam/mode shaping, pulse shaping, and pulse timing. Generally, combinations of optical elements can be utilized, and other appropriate combinations will be recognized by those skilled in the art. The objective lens can include, for example, one or more refractive, reflective, and/or diffractive optical elements. In one embodiment, an objective such as, for example, those used in microscopy can be conveniently obtained from commercial sources such as, for example, Carl Zeiss, North America, Thornwood, N.Y., and used as the objective lens 84. For example, the radiation system can include a scanning confocal microscope (for example, those available from Bio-Rad Laboratories, Hercules, Calif., under the trade designation "MRC600") equipped with a 0.75 numerical aperture (NA) objective (such as, for example, those available from Carl Zeiss, North America under the trade designation "20X FLUAR").

It can often be desirable to use optics with relatively large numerical aperture to provide highly-focused light. However, any combination of optical elements that provides a desired intensity profile (and spatial placement thereof) can be utilized.

V. Imaging Process

An exemplary imaging process according to this invention consists of directing collimated light from a laser through a lens toward the microlens sheeting and tracing the object with the light source. To create a sheeting having a floating image, as described further below, the light is transmitted through a diverging or converging lens. The radiation sensitive coating side of the sheeting is positioned away from the lens, so that the axis of the cone of light (the optical axis) is often perpendicular to the plane of the microlens sheeting, though it is sometimes at other angles.

Because each individual microlens occupies a unique position relative to the optical axis, the light impinging on each microlens will have a unique angle of incidence relative to the light incident on each other microlens. Thus, the light will be transmitted by each microlens to a unique position within the material, and produce a unique structure. More precisely, when the outline of the object is traced by a light source, a single light pulse produces only a single imaged area in the material layer, so to provide a structured area adjacent each microlens, multiple pulses of light are used to create that image out of multiple imaged smaller dots. For each pulse, the optical axis is located at a new position relative to the position of the optical axis during the previous pulse. These successive changes in the position of the optical axis relative to the microlenses results in a corresponding change in the angle of incidence upon each microlens, and accordingly in the position of the imaged area created in the material layer by that pulse. As a result, the incident light focusing on the radiation sensitive layer images a selected pattern in the radiation sensitive layer. Because the position of each microlens is unique relative to every optical axis, the image formed in the radiation sensitive material for each microlens will be different from the image associated with every other microlens.

Another method for forming floating composite images uses a lens array to produce the highly divergent light to image the microlensed material. The lens array consists of multiple small lenses all with high numerical apertures arranged in a planar geometry. When the array is illuminated by a light source, the array will produce multiple cones of highly divergent light, each individual cone being centered upon its corresponding lens in the array. The physical dimensions of the array are chosen to accommodate the largest lateral size of a composite image. By virtue of the size of the array, the individual cones of energy formed by the lenslets will expose the microlensed material as if an individual lens was positioned sequentially at all points of the array while receiving pulses of light. The selection of which lenses receive the incident light occurs by the use of a reflective mask. This mask will have transparent areas corresponding to sections of the composite image that are to be exposed and reflective areas where the image should not be exposed. Due to the lateral extent of the lens array, it is not necessary to use multiple light pulses to trace out the image.

By having the mask fully illuminated by the incident energy, the portions of the mask that allow energy to pass through will form many individual cones of highly divergent light outlining the floating image as if the image was traced out by a single lens. As a result, only a single light pulse is needed to form the entire composite image in the microlens sheeting. Alternatively, in place of a reflective mask, a beam positioning system, such as a galvometric XY scanner, can be used to locally illuminate the lens array and trace the composite image on the array. Since the energy is spatially localized with this technique, only a few lenslets in the array are illuminated at any given time. Those lenslets that are illuminated will provide the cones of light needed to expose the microlensed material to form the composite image in the sheetings.

After imaging, depending upon the size of the extended object, a full or partial copy of the object will be present in the radiation sensitive material behind each microlens. The extent to which the actual object is reproduced as an image behind a microlens depends on the energy density incident upon the microlens. Portions of an extended object may be distant enough from a region of microlenses that the energy incident upon those microlenses has an energy density lower than the level of radiation required to modify that material. Moreover, for a spatially extended image, when imaging with a fixed NA lens, not all portions of the sheeting will be exposed to the incident radiation for all parts of the extended object. As a result, those portions of the object will not be modified in the radiation sensitive medium and only a partial image of the object will appear behind the microlenses.

FIG. 2 is a plan view of a section of a microlens sheeting depicting sample images formed in the radiation sensitive layer adjacent to individual microlenses, and further showing that the recorded images range from complete replication to partial replication of the composite image. FIG. 3 is a photograph of a composite image 30 of intersecting circles within a rectangle formed by one embodiment of a sheeting. FIG. 4 is an SEM image of a portion 32 of the microlens sheeting of FIG. 3 which includes an array of partially complete structures 40, while FIGS. 5 and 6 show just one of the partially complete structures 40 of the sheeting of FIG. 3, from a top and perspective view, respectively.

The composite image formed by a sheeting can also be thought of as the result of the summing together of many structures within the sheeting, both partial and complete, all with different perspectives of a real object. The many unique structures are formed through an array of miniature lenses, all of which "see" the object or image from a different vantage point. Behind the individual miniature lenses, a perspective of the image is created in the material layer that depends on the shape of the image and the direction from which the imaging energy source was received. However, not everything that the lens sees is recorded in the radiation sensitive material. Only that portion of the image or object seen by the lens that has sufficient energy to modify the radiation sensitive material will be recorded.

The "object" to be imaged is formed through the use of an intense light source by either tracing the outline of the "object" or by the use of a mask. For the image thus recorded to have a composite aspect, the light from the object must radiate over a broad range of angles. When the light radiating from an object is coming from a single point of the object and is radiating over a broad range of angles, all the light rays are carrying information about the object, but only from that single point, though the information is from the perspective of the angle of the light ray. Now consider that in order to have relatively complete information about the object, as carried by the light rays, light must radiate over a broad range of angles from the collection of points that constitute the object. In this invention, the range of angles of the light rays emanating from an object is controlled by optical elements interposed between the object and the microlens material. These optical elements are chosen to give the optimum range of angles necessary to produce a composite image. The best selection of optical elements results in a cone of light whereby the vertex of the cone terminates at the position of the object. Optimum cone angles are greater than about 40 degrees.

The object is demagnified by the miniature lenses and the light from the object is focused onto the energy sensitive coating against the backside of the miniature lens. The actual position of the focused spot or image at the backside of the lens depends upon the direction of the incident light rays originating from the object. Each cone of light emanating from a point on the object illuminates a fraction of the miniature lenses and only those miniature lenses illuminated with sufficient energy will record a permanent image of that point of the object.

Different geometrical optics are used to form and view various types of composite images, such as images that float below the plane of the sheeting, images that float above the plane of the sheeting, and images that have a length, width and height and depth and appear below or above the sheeting only, or in any combination of below, in the plane of, and above the sheeting. The optics associated with forming and viewing these different image types are described in U.S. Pat. No. 7,068,434.

Exposure times generally depend upon the type of exposure system used to cause reaction of the reactive species in the photoreactive composition (and its accompanying variables such as numerical aperture, geometry of light intensity spatial distribution, the peak light intensity during the laser pulse (higher intensity and shorter pulse duration roughly correspond to peak light intensity)), as well as upon the nature of the photoreactive composition. Generally, higher peak light intensity in the regions of focus allows shorter exposure times, everything else being equal. Linear imaging or "writing" speeds generally can be about 5 to 100,000 micrometers/second using a laser pulse duration of about $10^{-8}$ to $10^{-15}$ second (for example, about $10^{-11}$ to $10^{-14}$ second) and about $10^2$ to $10^9$ pulses per second (for example, about $10^3$ to $10^8$ pulses per second).

In order to facilitate solvent development of the exposed photoreactive composition, a threshold dose of light (that is, threshold dose) can be utilized. This threshold dose is typically process specific, and can depend on variables such as, for example, the wavelength, pulse frequency, intensity of the light, the specific photoreactive composition, the specific microlens structure being fabricated, or the process used for solvent development. Thus, each set of process parameters can typically be characterized by a threshold dose. Higher doses of light than the threshold can be obtained, and can be beneficial, but higher doses (once above the threshold dose) can typically be used with a slower writing speed and/or higher light intensity.

The light beam induces a reaction in the photoreactive composition that produces a volume region of material having solubility characteristics different from those of the unexposed photoreactive composition. The resulting pattern of differential solubility can then be realized by a conventional development process, for example, by removing either exposed or unexposed regions.

Increasing the dose of light tends to increase the volume and aspect ratio of voxels generated by the process. Thus, in order to obtain voxels of low aspect ratio, it is generally preferable to use a light dose that is less than about 10 times the threshold dose, preferably less than about 4 times the threshold dose, and more preferably less than about 3 times the threshold dose. In order to obtain voxels of low aspect ratio, the radial intensity profile of the light beam is preferably Gaussian.

The exposed photoreactive composition can be developed, for example, by placing the exposed photoreactive composition into solvent to dissolve regions of higher solvent solubility, by rinsing with solvent, by evaporation, by oxygen plasma etching, by other known methods, and by combinations thereof. Solvents that can be used for developing the exposed photoreactive composition include aqueous solvents such as, for example, water (for example, having a pH in a range of from 1 to 12) and miscible blends of water with organic solvents (for example, methanol, ethanol, propanol, acetone, acetonitrile, dimethylformamide, N-methylpyrrolidone, and the like, and mixtures thereof); and organic solvents. Exemplary useful organic solvents include alcohols (for example, methanol, ethanol, and propanol), ketones (for example, acetone, cyclopentanone, and methyl ethyl ketone), aromatics (for example, toluene), halocarbons (for example, methylene chloride and chloroform), nitriles (for example, acetonitrile), esters (for example, ethyl acetate and propylene glycol methyl ether acetate), ethers (for example, diethyl ether and tetrahydrofuran), amides (for example, N-methylpyrrolidone), and the like, and mixtures thereof.

An optional bake after exposure to light under multiphoton absorption conditions, but prior to solvent development, can be useful for some photoreactive compositions such as, for example, epoxy-type reactive species. Typical bake conditions include temperatures in a range of from about 40° C. to about 200° C., for times in a range of from about 0.5 minutes to about 20 minutes.

Optionally, after exposure to polymerize the structured areas, preferably followed by solvent development, a nonimagewise exposure using actinic radiation can be carried out to effect reaction of the remaining unreacted photoreactive composition. Such a nonimagewise exposure can preferably be carried out by using a one-photon process.

VI. Microreplication Process

After a master sheeting having first structured areas is formed using the imaging process described herein, microreplication techniques are used to produce additional sheeting having copies of the structured areas present on the master sheeting. Various usable microreplication techniques are described in U.S. Pat. Nos. 5,691,846; 5,183,597; and U.S. Published Patent Application 2006-0134259.

In various embodiments, the additional sheetings are formed by using a substance that conforms to the first structured areas of the master sheeting. Conformable substances to be used with this technique should be capable of conforming to the first structured areas so that they can be reproduced with a high degree of accuracy. Examples of conformable substances include curable compositions and electroplated metal materials, such as nickel.

In one embodiment, the microlens array and the replicated structure array are formed in separate processes, and then mated to each other. In this embodiment, an initial step is to cover the first structure array of the master sheeting with a conformable composition. If a curable substance is used as the conformable composition, a curing step follows, such as exposure to UV or other radiation. For example, polydimethylsiloxane (PDMS) may be used to form the negative image or mold of the first structured array. Once the conformable composition has hardened, it is separated from the master sheeting. The resulting structure is the negative image of the desired structure array, which is used as a mold for another conformable composition.

The second conformable composition, which may be a curable composition such as a UV curable formulation or an electroplated material, forms a copy of the first structured array.

The microlens array can be produced using any of the techniques described herein, such as by various machining, molding, etching or other processes. Then the microlens array and replicated structure array are mated. A roll-to-roll process may be used to mate the microlens array and replicated structure array.

In another embodiment, the microlens array and the structured area array may be formed from coatings on opposite sides of a substrate. For example, a substrate is provided having a coating of curable composition on each side. For example, a UV curable resin or melt-processable resin may be used. On a first side of the film, the microlenses are formed. On a second side of film and directly opposite from one of the microlens arrays, an array of structured areas is formed by bringing the second side of the film in contact with a mold of the first structured array, followed by curing.

In various embodiments described herein, steps are performed to cause the microlens array to be associated with the replicated structure array, whether that happens when the microlens array is formed on a structure separate from the replicated structure array and then they are mated, or when the microlens array is formed on an opposite side of a single substrate from the structure array. More specifically, individual replicated structured areas are associated with individual microlenses. U.S. Pat. No. 7,165,959, describes techniques for casting a patterned surface on both sides of a web with a particular degree of alignment accuracy, and these techniques are useful in forming the microlens array and the structures area array on opposite sides of a web. For example, the patterns on the opposite sides are maintained in continuous registration to within at least 20 micrometers, and more preferably within at least 15 micrometers. In some embodiments of the invention, the patterns on opposite sides are maintained in continuous registration to within at least 5 micrometers or even more preferably at least 3 micrometers. In some embodiments of the invention, the patterns on opposite sides are maintained in continuous registration to within 10% of the diameter of each of the lenses of the microlens array.

In any of the embodiments described herein, the coating on the image side of the substrate can include a colored material to provide contrast within the structured areas.

VII. Examples

Example I

In a first example, a 2-mil thick PET substrate includes microlenses on one side, and a layer of photopolymerizable material on the other side. The microlenses are made of urethane acrylate, have a 30 micrometer diameter, and are arranged in a hex-packed configuration. On the opposite side of the substrate from the microlenses, a coating of five-micrometer thick of poly(methyl methacrylate) (PMMA) is present, with the following additives: 0.5% CGI 7460 ("CGI 7460" refers to tetrabutylammonium n-hexyl-tris(3-fluorophenyl)borate, obtained from Ciba Specialty Chemicals, Tarrytown, N.Y.) and 1% CD 1012 ("CD 1012" refers to a diaryliodonium salt from Sartomer Co., Inc., Exton, Pa.)

Another additive present in the PMMA coating is 0.5% concentrated solution of photosensitizer dye N,N,N-tris(7-(2-benzothiazolyl)-9,9-diethyl-2-fluorenyl)amine, prepared as described in Example 20 of U.S. Pat. No. 6,300,502. This composition is polymerized upon exposure to conditions resulting in simultaneous absorption of two or more photons.

The microlenses were replicated with a Fast Tool Servo (FTS) cut tooling roll, which displaces a cutting tool with respect to the work piece based on control signals received from a computer. The focal point of the lenses is at the interface between the 2-mil thick PET substrate and the PMMA layer.

An optical system as illustrated in FIG. 8 was used in the imaging process.

The light source used was a Spectra Physics Hurricane femtosecond laser system 72 operating at a frequency of 1 kHz with a wavelength of 800 nm.

The beam was modulated using a Uniblitz shutter 74. A variable neutral density filter 76 was used to control the Hurricane laser output from 60 mW to 520 mW depending on the location of the float height. In this example, the float heights used were 2 mm, 4 mm and 6 mm so the corresponding laser power delivered to the beam expander 78 was 198 mW, 346 mW and 495 mW.

The power was further controlled by an absorbing neutral density wheel set 80. In different versions of Example 1, the neutral density filter had an optical density of 0.5, 0.8 or 1.0. At the preferred optical density of 0.8 and the position of the final objective lens 84 set to float heights of 2 mm, 4 mm and 6 mm, the corresponding laser power was 31 mW, 54 mW, and 78 mW, respectively. Examples were written at these laser powers with an average velocity of 1 meter per minute by translating the stages 88 and 90.

After imaging, the PMMA was developed for about two minutes. The development time is determined based on the thickness of the photopolymerizable layer. The solvent used for development was poly(ethylene glycol) methyl ether acetate (PGMEA), which is available as SU-8 developer from MicroChem Corp., Newton, Mass.

FIG. 3 shows a photograph of intersecting circle images at different float/sink heights. The larger circle of each pair is floating above the plane and the smaller is floating below the plane of the sheeting. Moving from left to right across the top row of images in FIG. 3, the first image 30 has a float height of 4 mm for the larger circle and a sink distance of the smaller circle of 4 mm. The second image 34 has a float/sink height of 6 mm, and the third image 38 has a float/sink height of 2 mm. The images of FIG. 3 were written with the neutral density filter having an optical density of 0.5.

FIGS. 4-6 are SEM images of the individual microstructures formed behind each lens in the lens array. The structured areas that were produced were well-defined, with narrow feature width. The structured areas produced by the imaging process will be referred to as first structured areas.

Next, the first structured areas on these PMMA master tools were replicated. First, a polydimethylsiloxane (PDMS) copy was made of the first structured areas. The PDMS material is available from GE under the trade name "RTV 615" and was vacuum degassed after mixing, poured over the master tool, and cured at 80 degrees C. for about 10 minutes. This mold was then used with a UV curable formulation containing 75% by weight urethane acrylate resin available under the trade name "Photomer 6210", 25% by weight multifunctional acrylate available under the trade name "HDODA", and 1% photoinitiator available under the trade name "TPO-L", to duplicate the original tool features.

Figure 9:
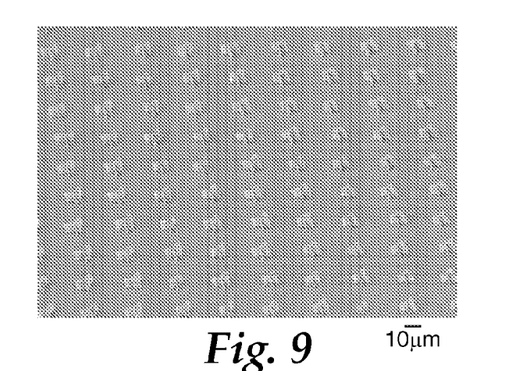
FIG. 9 is an SEM image of a portion of a replicated microlens sheeting that provides a composite image of intersecting rings that appear to float above the sheeting in accordance with the present invention.
Figure 10:
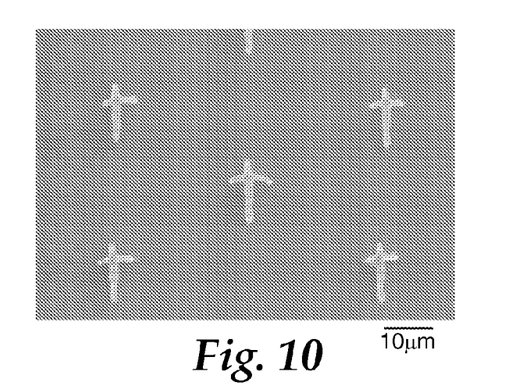
FIG. 10 is an SEM image from a top view of a portion of the microlens sheeting of FIG. 9 illustrating several partially complete structures.
Figure 11:
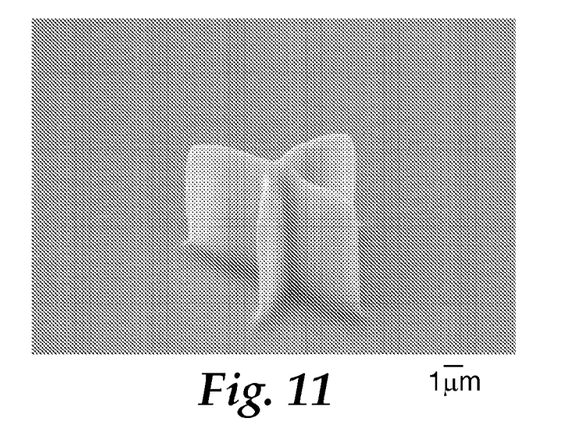
FIG. 11 is an SEM image from a perspective view of a portion of the microlens sheeting of FIG. 9 illustrating a single partially complete structure.

FIGS. 9-11 show three different SEM images of the replicated features. The PDMS mold and UV curable formulation reproduced the master features well. The replicated features were then combined with replicates of the original lens array. The duplicated construction produced an image that had all the characteristics of a laser drawn floating image.

Example II

Thinner Resist Layer

For Example II, the same conditions, equipment and compositions as in Example I were used, except that the resist layer was about 1.5 to 1.7 micrometer thick. The resulting master tool produced by the imaging process had very sharp features.

Example III

Higher Repetition Rate

In Example III, many of the same conditions, equipment and compositions as in Example I were used. However, a different laser source was used to expose the PMMA. The laser source used is from Spectra-Physics, Mountain View, Calif., under the trade designation "MAI TAI", tunable to wavelengths in a range of from 750 to 850 nanometers, and having a repetition frequency of 80 megahertz, and a pulse width of about 100 femtoseconds ($1 \times 10^{-13}$ sec), with an average power level up to 1 Watt. The power was kept fairly low, so the writing speed was also slower at 0.5 mm/second.

The lens array was also different than in Example I and was composed of 150-micrometer-diameter lenses laid out in a square array. The reverse side of the PET substrate was coated with about 30 micrometers of PMMA.

The imaging process was carried out for a 2 mm floating/sinking intersecting circle image. The partial structured areas had a larger size compared to the structured areas from the other examples, partly due to the thicker resist layer and also because the lenses are much larger.

Example IV

Single Photon Process

In Example IV, many of the same conditions, equipment and compositions as in Example I were used. However, a composition of PMMA was used that is polymerized upon exposure to conditions resulting in absorption of a single photon. The coating of PMMA was 20 micrometer thick. In the optical system used to form the master sheeting, a frequency doubling crystal commercially available under the trade name "TP-1A" available from Spectra-Physics, Mountain View, Calif. was inserted in the laser beam path. This nonlinear crystal uses second harmonic generation to double the laser frequency, resulting in a measured wavelength of 420 nm.

Three different lens arrays were used, including a 30-micrometer-diameter lens array made using an FTS cut tool as used in Example I. Also, a 30-micrometer-diameter, hex-packed lens array was used, which was produced by the excimer laser machining of flats (ELMoF) process. See, for example, U.S. Pat. No. 6,285,001 to Fleming et al., dated Sep. 4, 2001, for details on the ELMoF process. In addition, the 150-micrometer-diameter, square lens array of Example II was used.

Figure 12:
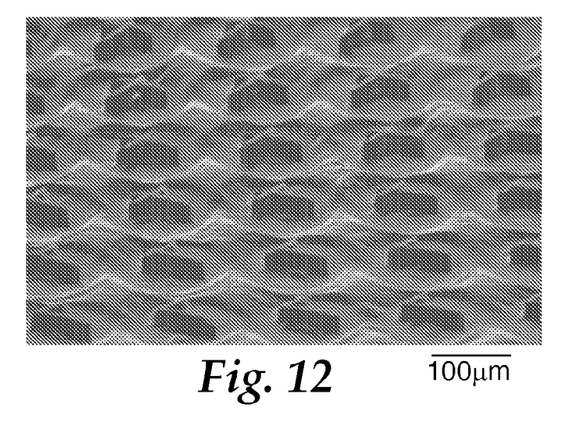
FIG. 12 is an SEM image of a microlens sheeting with a single-photon polymerizable material that has been exposed to provide a composite image of intersecting rings in a box that appears to float above the sheeting in accordance with the present invention.
Figure 13:
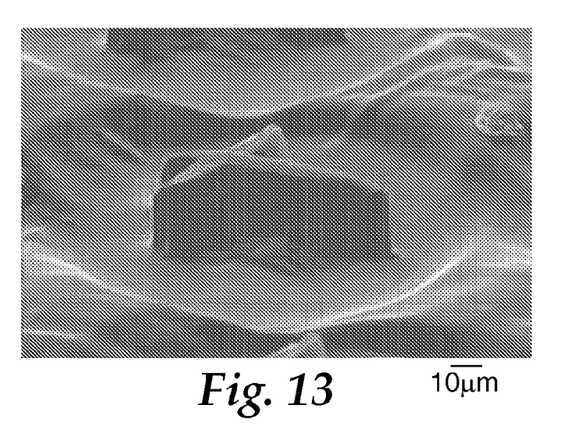
FIG. 13 is an SEM image from a perspective view of a portion of the microlens sheeting of FIG. 12 illustrating a single partially complete structure.

For each lens array, different dose levels were used. Every dose level attempted formed discrete features and each image did exhibit floating to some degree. However, the lines of the images were wide and lacked definition. FIGS. 12-13 are micrographs of microstructures produced using the 150-micrometer-diameter lens array. FIGS. 12-13 illustrate that there was extra material cured around the features from overexposure and scattering.

By lowering the power to avoid the effects of overexposure, the image could be improved. However, too much PMMA in undesirable areas remained and prevented the formation of a crisp image, even at the lowest selected doses. This example confirms the advantages of a multi-photon process.

Example V

Tools on Alternate Substrates

A 1.5 micrometer thick layer of the same acrylate resist described in Example I was coated onto a silicon wafer. A sheet of microlens film was provided consisting of 150 micrometer diameter urethane acrylate microlenses arranged in a square-packed lens array on a 5-mil PET substrate. The microlens film was coated with a drop of immersion oil commercially available from Cargille Labs of Cedar Grove, N.J. under the designation Immersion Liquid Code 1160. After uniformly spreading the oil so as to cover the entire backside of the lens film, this oil coated side of the sheet was brought into contact with the resist coated wafer. A small, rubber roller was utilized to laminate the construction together and remove entrapped air, with the immersion oil functioning both to match the refractive indices of the PET and resist and also as a release agent.

The microlens array and the layer of photopolymerizable material are separate structures in this example.

The imaging was performed as in Example I with the exception of slightly different laser power levels. At a float (or sink) height of 2 mm, the power was set to 80 mW and at 6.35 mm the power was 400 mW. As in Example I, different versions had the laser power further reduced by a neutral density filter with an optical density of 0.5, 0.8, or 1.0. The translation speed during imaging was again 1 m/min.

After imaging, the microlens film was peeled off of the wafer and the pattern on the wafer was developed using PGMEA as in Example I. The resultant features on the silicon constitute a master tool.

Example VI

Nickel Plating of Master Tool

The master tool fabricated in Example V was electroplated with nickel to form a robust tool that can be easily replicated. To produce an electrically conductive surface for electrode-positing the nickel, 100 nanometers of silver metal was deposited on the master tool by a vacuum evaporation process.

The coated tool was placed into the nickel plating bath consisting of the following components by volume percentage: 53% nickel sulfamate, 42% de-ionized water, 4% nickel bromide, and 1% boric acid. For 6 gallons of this solution, 3 grams of a diocedyl surfactant is also added. The temperature of the bath is held at 133° Fahrenheit and a current density of 10 amps per square foot is introduced for one hour. After this time, the current density is increased to 20 amps per square foot until the desired thickness of nickel is reached.

After removal of the completed structure from the plating bath, the master tool was pried from the nickel mold revealing the nickel tool surface. The nickel tool surface was an accurate reproduction of the master tool.

Various modifications and alterations of this invention will be apparent to those skilled in the art without departing from the scope and spirit of this invention, and it should be understood that this invention is not limited to the illustrative embodiments set forth herein. All U.S. patents, patent application publications, and other patent and non-patent documents referred to herein are incorporated by reference, to the extent they are not inconsistent with the foregoing disclosure.

What is claimed is:

1. A method of forming a sheeting from a master tool, comprising:

provide a first sheeting comprising a first array of microlenses and a photopolymerizable first material layer adjacent to the first array of microlenses;

exposing the first sheeting to a radiation source to form a master tool comprising a plurality of polymerized first structured areas in the first material layer, wherein said exposing the first sheeting to the radiation source comprises directing collimated light from a laser through a lens toward the first array of microlenses such that the resulting divergent light impinges on the array of microlenses is then transmitted through the microlenses and causes a chemical change to the photopolymerizable first material layer, wherein at least some of the first structured areas comprise a portion shape in common with at least some of the other first structured areas, and wherein each first structured area is associated with one of the first array of microlenses, wherein the photopolymerizable first material layer is polymerized upon exposure to conditions resulting in simultaneous absorption of two or more photons;

replicating the plurality of first structured areas using a substance that conforms to the plurality of structured areas to form a second material layer having a plurality of replicated structured areas;

associating the second material layer with a second array of microlenses to form a second sheeting, wherein individual replicated structured areas are associated with individual microlenses in the second array of microlenses;

wherein each of the second array of microlenses has a refractive surface that transmits light to a position of the second material layer to produce, under reflected or transmitted light, a composite image from the replicated structured areas formed within the second material layer, where the composite image appears to float above or below the second sheeting.

2. The method of claim 1 wherein a part of the composite image appears to float above the second sheeting and a different part of the composite image appears to float below the second sheeting.

3. The method of claim 1 wherein the first array of microlenses is formed as a layer separate from the first material layer.

4. The method of claim 1 wherein at least one of the structured areas has a dimension that protrudes above a plane of the master tool or is recessed below the plane of the master tool by at least 1 micrometer.

5. The method of claim 1 wherein at least one of the structured areas has a dimension that protrudes above a plane of the master tool or is recessed below the plane of the master tool by at least 4 micrometers.

6. The method of claim 1 wherein the replicated structured areas include at least two partially complete structures, wherein the partially complete structures each include at least one portion in common with the composite image.

7. The method of claim 1, wherein the substance that conforms to the plurality of structured areas is a curable composition.

8. The method of claim 1, wherein the substance that conforms to the plurality of structured areas is an electroplated metal.

9. A method of using a master tool to form a sheeting, comprising:
- providing a first sheeting comprising a first array of microlenses and a photopolymerizable first material layer adjacent to the first array of microlenses, wherein the photopolymerizable material is polymerized upon exposure to conditions resulting in simultaneous absorption of two or more photons;
- exposing the first sheeting to a radiation source to form a master tool comprising a plurality of polymerized first structured areas in the first material layer, wherein said exposing the first sheeting to the radiation source comprises directing collimated light from a laser through a lens toward the first array of microlenses such that the resulting divergent light impinges on the array of microlenses is then transmitted through the microlenses and causes a chemical change to the photopolymerizable first material layer, wherein at least some of the first structured areas comprise a portion of some of the other first structured areas, and wherein each first structured area is associated with one of the first array of microlenses;
- replicating the plurality of first structured areas using a substance that conforms to the plurality of structured areas to form a second material layer having a plurality of replicated structured areas;
- associating the second material layer with a second array of microlenses to form a second sheeting, wherein individual replicated structured areas are associated with individual microlenses in the second array of microlenses;
- wherein each of the second array of microlenses has a refractive surface that transmits light to a position of the second material layer to produce, under reflected or transmitted light, a composite image from the replicated structured areas formed within the second material layer, where the composite image appears to float above or below the second sheeting.

10. The method of claim 9 wherein a part of the composite image appears to float above the second material layer and a different part of the composite image appears to float below the second sheeting.

11. The method of claim 9 wherein the replicated structured areas have at least two partially complete structures formed therein, wherein the partially complete structures each include at least one portion in common with the composite image.

12. The method of claim 9 wherein each of the first array of microlenses has a refractive surface that transmits light to a position of the material layer to produce, under reflected or transmitted light, a composite image from the structured areas formed within the first material layer, where the composite image appears to float above or below the first sheeting.

13. A photolithography process using visible or infrared radiation, comprising:
- providing a first array of microlenses and a photopolymerizable first material layer adjacent to the microlenses;
- exposing the first material layer to a radiation source including visible or infrared radiation, wherein said exposing the first sheeting to the radiation source comprises directing collimated light from a laser through a lens toward the first array of microlenses such that the resulting divergent light impinges on the array of microlenses is then transmitted through the microlenses and causes a chemical change to the photopolymerizable first material layer;
- developing the photopolymerizable first material layer to form a master tool comprising a plurality of polymerized first structured areas in the first material layer,
  - wherein at least some of the first structured areas comprise a portion shape in common with some of the other first structured areas,
  - wherein the first structured areas within the first material layer form a composite image,
  - wherein the composite image appears to float above or below the master sheeting,
  - wherein each first structured area is associated with one of the first array of microlenses,
  - wherein the polymerized first structured areas are polymerized upon exposure to conditions resulting in simultaneous absorption of two or more photons; and
  - wherein at least one feature dimension of a plurality of the first structured areas is less than or equal to 70 nanometers.

* * * * *

UNITED STATES PATENT AND TRADEMARK OFFICE
CERTIFICATE OF CORRECTION

PATENT NO. : 8,586,285 B2
APPLICATION NO. : 12/744515
DATED : November 19, 2013
INVENTOR(S) : Gates et al.

Page 1 of 1

It is certified that error appears in the above-identified patent and that said Letters Patent is hereby corrected as shown below:

On the Title Page, Item [75], Column 1
Delete "Oscelola," and insert -- Osceola, --, therefor.

In the Specification
Column 7
Line 38, delete "application Ser. No. 11/313,482," and insert -- Attorney Docket No. 60893US002, and application Ser. No. 11/313,482, --, therefor.

Signed and Sealed this
Fifteenth Day of July, 2014

Michelle K. Lee
*Deputy Director of the United States Patent and Trademark Office*